June 23, 1964    H. K. STUCKAS ETAL    3,138,554
FILTER
Filed Dec. 30, 1960
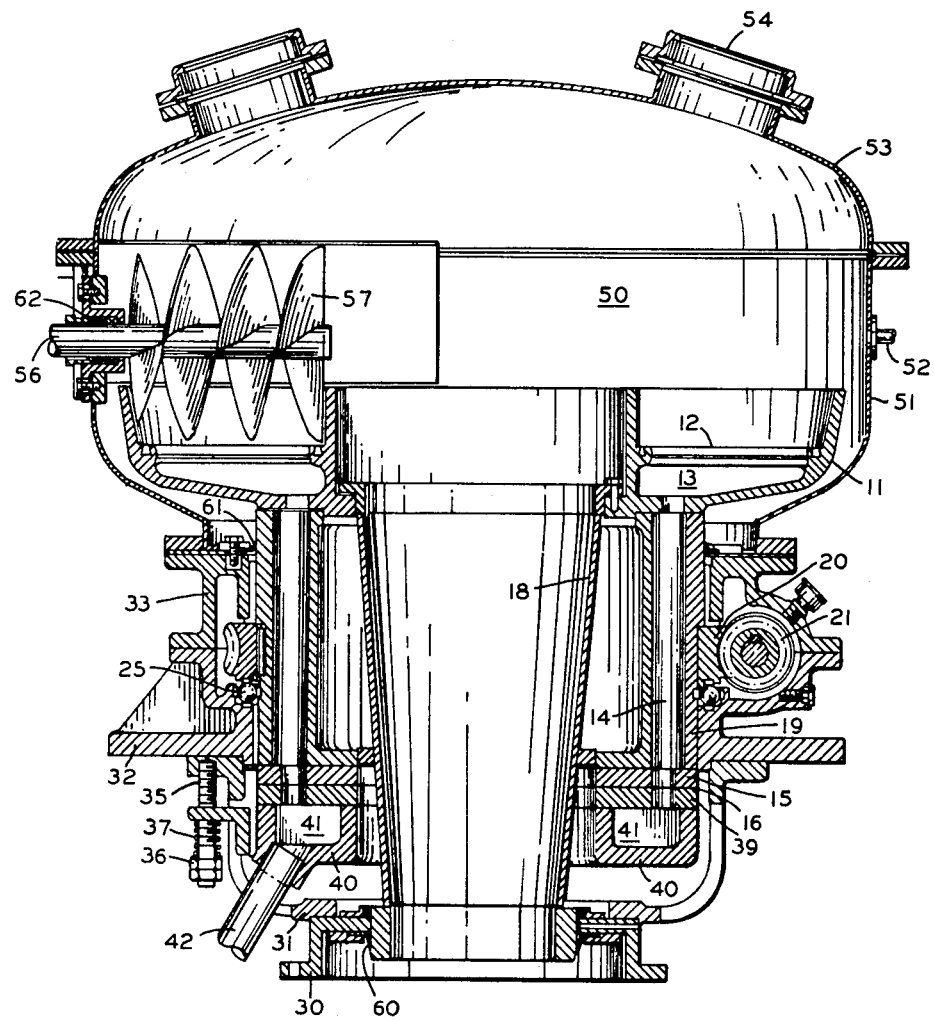
INVENTORS.
HERMANN KARL STUCKAS
HELMUTH KLINGER
BY Philip Mintz
ATTORNEY.

3,138,554
FILTER
Hermann Karl Stuckas and Helmuth Klinger, Wiesbaden, Germany, assignors to Dorr-Oliver Incorporated, Stamford, Conn., a corporation of Delaware
Filed Dec. 30, 1960, Ser. No. 79,647
1 Claim. (Cl. 210—393)

This invention relates to continuous rotary horizontal table filters, and more particularly to the means for discharging the filtered solids from such a filter.

Continuous rotary horizontal table filters are well known and have been used by industry for many years. Such a filter customarily has a horizontal annular filter table mounted for continuous rotation about a central vertical axis. Each point of the annular filter table, in its continuous rotation, moves past a plurality of zones. In at least one of these zones, a slurry of solids suspended in liquid is fed onto the surface of the filter table. During the rotation of the table, the liquid passes through the filter medium and is conducted away as filtrate leaving the solids deposited on the filter surface as a filter cake. In subsequent zones, the filter cake may be washed one or more times if desired to free it from any filtrate remaining therein. In a still later zone, the filter cake, freed of most of the original liquid, is removed from the surface of the filter by a plow, a scraper mechanism, or (preferably) a scroll, which may be assisted by the use of "blow-back" or positive gas pressure exerted from behind the filter medium to loosen the filter cake. In a zone subsequent to the filter cake removal, the surface of the filter table may be washed, cleansed, precoated, or otherwise prepared for receipt of fresh slurry in the next zone which repeats the above conventional cycle of operations.

In filters of this type, the filter cake removal mechanism has invariably been arranged so as to discharge the filter cake outwardly over the outer periphery of the filter table. The present invention, however, is predicated on the discovery that such a filter can be modified to have the filter cake discharge over the inner periphery in the center of the annular filter table and through a centrally disposed discharge outlet. With such modification, considerable structural and operational advantages can be achieved. Among such advantages are simplification of the structure of the rotary valve which provides for the proper sequence and separation of vacuum, various filtrate and wash removal, and pressurized blow-back steps and conduits; easier assembly and disassembly of the structure as a whole; simplification of the problems of providing seals between the moveable and the stationary portions of the apparatus; and reduction in size of the structures surrounding the rotating filter table to a diameter not much larger than the rotating table itself. These last two mentioned advantages are particularly significant if the filter is constructed for use as a pressure filter instead of the more common vacuum type.

The above features and advantages, as well as others which will become evident as the specification proceeds are mainly achieved through the modification of the rotary horizontal table filter to provide for the filter cake discharge means operating to discharge the filter cake through a centrally disposed discharge outlet leading from the center of the annular filter surface.

Illustrative of a specific embodiment of this invention is the accompanying drawing, the sole figure of which shows a vertical cross-section through the center of a rotary horizontal table filter (with parts omitted for clarity) constructed in accordance with the teachings of this invention.

Referring now to the drawing, the continuous rotary horizontal table filter illustrated is provided with a fluid-tight casing for operation as a pressure filter. This filter generally includes a plurality of parts mounted for conjoint rotation within a stationary casing supported by a stationary frame.

The rotatable portion of the filter includes an annular filter tray 11 provided with an annular filter surface 12 overlying a plurality of drainage compartments 13, each of which is provided with a filtrate discharge tube 14 terminating in orificed pipe plate 15 forming one portion of conventional automatic valve 16. The rotation of annular filter tray 11 with its central discharge chute 18 is accomplished by rotating the drive tube 19, upon which tray 11 is supported, by drive gear 20 rotated by worm gear 21 which is turned by a suitable drive mechanism (not shown).

The above described rotatable portion of the filter is supported through ball bearing 25 on the stationary frame base 30 by means of intermediate frame sections 31, 32, and 33. Resiliently affixed to the underside of intermediate frame section 32 by means of threaded rods 35 utilizing nuts 36 and springs 37 is the remainder of conventional automatic valve 16 which includes wear plate 39 attached to valve body 40. Valve body 40 includes various compartments 41, to each of which a conduit, such as pipe 42, is provided for drainage of filtrates, wash liquids, etc. or for providing positive blow-back pressure for assisting in filter cake removal.

Affixed to the upper portion of intermediate frame member 33 is a fluid-tight casing 50 having a lower portion 51 provided with a conduit 52 for admitting gas under pressure to which is secured, as by bolting, an upper portion 53 provided with windows 54 for observing the operation of the filter within casing 50. Extending through the wall of the lower portion 51 of casing 50 is the rotatable shaft 56 of the scroll 57 which extends radially of the filter surface 12 of filter tray 11 in the filter cake discharge zone. Rotation of scroll 57 in the appropriate direction by drive means (not shown) coupled with rotation of the filter tray 11 in the proper direction serves to propel filter cake from the filter surface 12 radially inwardly into central discharge chute 18.

Also located within casing 50 and extending through lower portion 51 are the usual feed conduits, spray devices, etc. which have been omitted from the figure to avoid unduly complicating the drawing.

To provide for proper pressurization and to prevent leaks, simple seals are provided between all parts moving relative to each other subjected to pressure, such as seal 60 secured to base 30, seal 61 secured to intermediate frame member 33, and seal 62 surrounding shaft 56. No separate seal is required in conventional automatic valve 16. Since the feed is introduced under pressure and the filter cake discharges through chute 18 to a vessel (not shown) below stationary frame base 30 maintained under pressure, the pressure introduced through conduit 52 does not leak away, but is all utilized for filtration purposes.

Because the filter cake discharge means (scroll 57) operates to propel the filter cake towards the axis of rotation of the tray 11 of the filter table and through axial discharge chute 18, previously mentioned advantages are possible.

While the subject invention has been described and illustrated in a particular configuration and application, it is to be understood that the foregoing has been merely descriptive, the invention being limited solely as defined in the subjoined claim.

We claim:
A rotary table filter comprising a rotary filter tray having an annular filter surface, a plurality of drainage compartments integral with and underlying said filter tray and communicating therewith, a central cake discharge opening surrounded by said filter tray, a cake discharge chute extending downwardly from said discharge opening and being fixedly connected to said filter tray and rotatable therewith, a plurality of filtrate discharge tubes extending downwardly from said drainage compartments and communicating therewith, said discharge tubes surrounding said cake discharge chute and rotatably supporting said filter tray, an annular stationary valve structure supported adjacent the lower ends of the filtrate tubes, said valve structure comprising a plurality of compartments and means providing fluid communication between one end of each of said compartments and said filtrate discharge tubes, conduit means connected to the other end of each of said compartments to provide drainage of filtrates therefrom or positive blow-back pressure thereto, a fluid tight casing enclosing said filter tray and having a bottom opening through which said filtrate discharge tubes extend, a stationary frame structure fixedly connected to the lower end of said casing and surrounding said filtrate discharge tubes, an annular sealing means having one end thereof fixedly connected to the upper end of said frame structure and the other end sealingly engaging the periphery of said filtrate discharge tubes, a drive gear surrounding said filtrate discharge tubes and fixed thereto below said annular sealing means, drive means mounted in said frame structure for engaging said drive gear to rotate said filter tray, bearing means in said frame structure beneath said drive gear for rotatively supporting said filter tray and its drainage compartments and discharge tubes, means to supply slurry onto said filter surface, means to introduce pressure fluid into said casing above said filter tray, and a scroll in said casing extending radially of the filter surface to remove filter cake from said filter surface and discharge the same into said discharge chute.

References Cited in the file of this patent

UNITED STATES PATENTS

| | | |
|---|---|---|
| 1,201,014 | Boudwin | Oct. 10, 1916 |
| 2,798,612 | Crumb | July 9, 1957 |
| 2,818,177 | Richards | Dec. 31, 1957 |
| 3,015,397 | Schwartz | Jan. 2, 1962 |